3,733,293
WATER AND ABRASION RESISTANT COATINGS HAVING LOW GLOSS FROM AQUEOUS SYSTEMS
John F. Gallagher and Martin Salo, Rochester, N.Y., assignors to Eastman Kodak Company, Rochester, N.Y.
No Drawing. Filed Mar. 10, 1971, Ser. No. 123,019
Int. Cl. C08f 37/18
U.S. Cl. 260—29.6 RW        8 Claims

ABSTRACT OF THE DISCLOSURE

It has been discovered that certain blends of polymers can be applied from an aqueous system to glossy surfaces and dried to yield coated surfaces that have a pleasing degree of roughness or "matte" and that are water and abrasion resistant, anti-blocking, and essentially completely transparent to visible light.

The coatings are applied to the glossy surface in the form of an aqueous lacquer composition comprising
(a) water;
(b) dissolved in the water, an effective amount of ammonium salt or a copolymer of ethyl methacrylate and methacrylic acid; and
(c) dispersed in the form of a latex through the solution of (b) in (a), an effective amount of a higher molecular weight poly(vinyl acetate).

---

This invention relates to special compositions that are useful in the preparation of "matte" or low gloss surface coatings that are extremely transparent and are both water and abrasion resistant. More particularly, the present invention is directed to aqueous lacquer compositions comprising special polymer blends, which lacquer compositions are safe to use.

While the present invention was developed primarily to solve problems in the photographic art, and the following discussion will be largely directed to those problems and that art, it will be evident from the following discussion that the processes and compositions of the present invention are broadly applicable to the surface coating art, particularly where a given surface needs to (a) have a coating having lower gloss, (b) have a coating which is both water and abrasion resistant and (c) be practically completely visible through any coating that is applied thereto to achieve (a) and (b).

High quality photographic reproductions (i.e. photographs and transparencies) almost invariably are comprised of (1) a substrate (such as paper in the case of photographs, and smooth transparent polymeric films in the case of transparencies) and (2) a photographically reproduced image suspended in a layer of transparent material (which most often consists essentially of gelatin). The gelatin layer(s) containing the image are sometimes overcoated with one or more layers (a) to provide protection in some instances from water spots, fingerprints, dust and the like, and/or (b) to attain a particularly desirable less glossy surface "finish," such as a "matte" finish, if desired. Sometimes the finished photographic products contain no "overcoats" over the developed gelatin layer(s). Also, in many instances in which transparencies are involved, viewing of the transparencies is accomplished from the reverse side of the transparency. Thus, the surface nearest the viewer would be the very glossy surface of the transparent polymeric film substrate (containing at most a very thin surface coating of a conventional polymeric "subbing" material, which is also glossy). Such glossy surfaces have typical "60° gloss" values of at least about 30, and often higher than 50. Unless such a surface has been specially treated to reduce its gloss (for example, by applying thereto a coating that develops a so-called "matte" finish), the glossy surface exposed to the viewer is undesirable because of various reflections that result from lights and the like around, above and behind the viewer which often detract from his desired view of the image. The same sort of detraction is true of transparencies viewed from the "emulsion" side. Similarly, reflective distractions occur to an undesirable extent when glossy photographs are viewed. Thus, a matte finish is often desired, and in some instances (for example when very large transparencies such as the Kodak "Colorama" transparencies in Grand Central Station in New York City are displayed and viewed) a matte finish is almost necessary to permit viewers to obtain the desired effect from their various positions around the display.

While matte surface coatings, per se, have heretofore been applied to many surfaces in many ways, the conventional methods useful for coating photographic images have either been inherently dangerous (and thus unsatisfactory) because the coatings had to be applied from systems that contain volatile, flammable organic materials like toluene, xylene and alcohol, or have been unsatisfactory because they could not meet other basic requirements (such as being essentially completely transparent to visible light, non-reactive with various sensitive components in the image, waterproof and sufficiently adhesive and abrasion resistant) for such a coating.

Therefore, it is an object of this invention to provide new lacquer compositions, the use of which is essentially free of fire hazards, which lacquer compositions are useful in providing a matte surface on articles treated with the compositions.

It is another object of this invention to provide aqueous lacquer compositions useful in providing water and abrasion resistant matte coatings on the surface(s) of articles otherwise having glossy surfaces, which coatings are almost completely transparent.

It is still another object of this invention to provide aqueous lacquer coating compositions useful in providing water and abrasion resistant matte finishes upon the surface(s) of developed photographic articles, which finishes are at least about 98 percent transparent to visible light and which coating compositions and finishes are essentially non-reactive with any of the components in said developed photographic articles.

It is still another object of this invention to provide developed photographic articles having a matte coating upon at least one surface thereof which is practically completely transparent to visible light, water, and abrasion resistant, and which adheres tightly to said surface.

These objects, and others which will become apparent from the following discussion and claims, can be attained by making and/or utilizing a coating composition comprising (a) water;
(b) dissolved in said water, an effective amount of one or more useful copolymers of ethyl methacrylate and methacrylic acid, ammonium salt having intrinsic viscosities of at least about 0.2; and
(c) dispersed through said water, in the form of a latex, an effective amount of a high molecular weight poly(vinyl acetate).

It is believed surprising, first of all, that this particular combination of polymers can result in an acceptable matte finish, and also that such a relatively uncomplicated combination of materials can yield coatings having all of those valuable properties described above. This is particularly true in view of the fact that neither coatings of the ammonium copolymers alone nor coatings of the poly(vinyl acetates) alone exhibit all of these valuable properties. Thus, relatively pure poly(vinyl acetate) coatings have poor abrasion resistance and poor water resistance.

In addition, such coatings of poly(vinyl acetate) have strong tendencies to "block" or to stick together after they are stored for a short time. Similarly, coatings of the particular ammonium copolymers that are useful in the practice of this invention [in the absence of the necessary amount of high molecular weight poly(vinyl acetate)] are too glossy.

The ammonium salts of ethyl methacrylate/methacrylic acid copolymers that can be used successfully in the practice of this invention are known substances, and methods for their preparation are well known in the art. Such useful polymers are made up of molar ratios of ethyl methacrylate to methacrylic acid of from about 1:1 to about 2:1, respectively, and preferably are those copolymers made up of units derived from monomers in molar ratios of from about 1.25 to 1 to about 1.75 to 1, respectively. Of particular and somewhat unusual interest, also, is the fact that, in the practice of this invention, not all of the carboxylic acid groups in the copolymer need be in the form of the ammonium salt. Thus, whereas at least enough of the ammonium salt need be present to make the resulting copolymer soluble in water (in the preparation of the aqueous lacquer compositions of this invention), almost invariably, the necessary solubility in water can be attained, if desired, by only partially "neutralizing" the carboxylic acid groups on the copolymeric chain. For example, the necessary complete water solubility for these copolymers can be obtained by reacting only about 80 percent of the carboxylic acid groups in the useful copolymers with ammonium hydroxide. However, more ammonium groups on the copolymer chains than this necessary minimum can be utilized if desired, without detracting from the benefits that can be obtained via the practice of this invention. In order to dissolve the copolymer, a preferred procedure is to slurry powdered acidic copolymer in water, add the necessary amount of ammonium hydroxide to the slurry, and stir at ambient temperatures until the copolymer dissolves. Excess ammonium hydroxide can be present in the slurry and in the resulting solution, if desired (so long as such excess does not cause degradation of the latex), but such excess is not essential and probably represents an unnecessary expense.

The copolymers of ethyl methacrylate and methacrylic acid that are useful in the successful practice of this invention are all of those having intrinsic viscosities (measured at 25° C. in ethyl alcohol) of at least about 0.2; preferably of from about 0.25 to about 1. Still further preferred are those having I.V.'s of from about 0.3 to about 0.6. It is also necessary, for the successful practice of this invention, that aqueous solutions of the ammonium salt of these copolymers be used, rather than aqueous solutions of the alkali metal salts because the alkali metal salts would retain their high water-solubility characteristics in the final coating layers, thereby not attaining the necessary water and smudge resistant qualities.

By comparison, the ammonium copolymeric salts lose their ability to dissolve in water upon the drying of the lacquer coating because a very large proportion of the ammonium cations become ammonia under event ambient drying and/or curing conditions and simply evaporate from the film into the atmosphere. The resulting film thereby becomes substantially insoluble in water even though a very small proportion of the copolymeric carboxylic acid groups apparently retain their ammonium salt character. From this it can be seen that, even though the aqueous lacquer coating compositions of this invention can be described in terms that include a description of the copolymer as being largely ammonium salts (dissolved in the water) the copolymeric portion of the final protective coatings of this invention cannot be described in this way because the copolymers are (a) substantially insoluble in water and (b) because they are almost entirely in the carboxylic acid form again. Fortunately, the coatings of the present invention can be distinguished from otherwise similar (but non-ammonium) polymer mixtures that might have been laid down from an essentially organic solvent system by (1) the matte finish of the present films and (2) by the presence of a measurable amount of ammonia in the present coatings.

The poly(vinyl acetate) latexes that are useful in the practice of the present invention are all of those dispersions of poly(vinyl acetate) in water in the latex form having "total solids" (measured by evaporation at 105° C.) of at least about 3 weight percent. Also, the average molecular weight of the high molecular weight poly(vinyl acetates) that are useful should be at least about 50,000, and preferably should be at least about 80,000. Processes for manufacturing such useful poly(vinyl acetate) latexes are well known to those in the art, and are exemplified by the processes described in "Kinetics and Mechanism of Polymerization," edited by G. E. Ham, vol. I, pp. 73–90, Marcel Dekker Inc., New York (1969). It is to be understood that commercially available poly(vinyl acetate) latexes which meet these requirements contain, in addition to water and the polymer, small amounts of additives such as surfactants and/or protective colloids (to provide stability of the latex, for example), and the like. These latexes are perfectly acceptable for use in the practice of the present invention, the various additives therein apparently having little or no effect upon the benefits that can result therefrom.

Generally, in the practice of the present invention, the aqueous lacquer compositions that are sold and shipped commercially will be either "concentrate" compositions or "ready to use" compositions. The "concentrate" compositions can be converted to "ready to use" compositions by simply diluting the "concentrate" with water. Hence, whereas the preferred "ready to use" compositions will ordinarily contain (a) at least about 90 weight percent of water,
(b) at least about 3 weight percent of the dissolved ammonium copolymer described above, and
(c) at least about 2 weight percent of dispersed high molecular weight poly(vinyl acetate), as described above, and will have a Ford No. 4 Cup viscosity at 25° C. of at most above 20 (because such viscosities are most desirable for spraying in conventional equipment); the "concentrate" compositions of this invention can contain as much as a total (combined weight) of about 30 weight percent of dissolved ammonium copolymer plus dispersed poly(vinyl acetate), and conversely, as little as about 70 weight percent of water. The controlling feature here is that the poly(vinyl acetate) must be in the form of a latex in both the "concentrate" and the "ready to use" compositons of this invention.

In the following examples, all "parts" given are by weight unless otherwise specified.

EXAMPLE 1

Preparation of "ready to use" aqueous lacquer composition

Step A.—Initially, 600 parts of a finely ground (−80 mesh U.S. Standard) acidic copolymer of ethyl methacrylate and methacrylic acid (joined in a monomeric molar ratio of 1.5 to 1, respectively) having an intrinsic viscosity of 0.39 are shaken with 9250 parts of distilled water until the copolymer particles are well wetted and dispersed through the water. Then 150 parts of 28 weight percent amonium hydroxide are blended into the resulting slurry. (This is about 80 percent of the theoretical amount of ammonium hydroxide required to react with all of the carboxylic acid groups on the acidic copolymer, but is also enough to cause the resulting "partial" ammonium copolymer salt to dissolve in the water.) Dissolution of the copolymer occurs while the resulting blend is tumbled for 16 hours in a sealed glass container at room temperature.

Step B.—Seven hundred fifty parts of the solution prepared in "Step A" are then blended with 224 parts of distilled water and 26 parts of an approximately 55 weight percent latex of high molecular weight poly(vinyl acetate) in water (commercially available from the Union Carbide Corporation under the trade name "Ucar Latex acetate) latexes to overcome substantially all of the shortcomings of such latexes without apparently having any adverse effect upon gloss levels of coatings of the resulting blends.

TABLE I

| Example No. | Parts | | | | | 60° gloss, percent | Adhesion test | Water spotting | Blocking resistance | Hardness |
|---|---|---|---|---|---|---|---|---|---|---|
| | Acidic copolymer | Poly (vinyl acetate) | NH₄OH (28%) | H₂O | Plasticizer¹ | | | | | |
| 2 (control) | 6.0 | | 1.5 | 92.5 | | 24 | Good | Good | Good | Good. |
| 3 (control) | | 6.0 | | 94.0 | | 13 | ....do.... | Poor | Blocks | Poor. |
| 4 | 4.5 | 2.6 | 1.2 | 91.7 | | 14 | ....do.... | Good | Good | Good. |
| 5 | 4.5 | 2.6 | 1.2 | 91.4 | 0.3 | 17 | ....do.... | ....do.... | ....do.... | Do. |
| 6 | 4.5 | 2.6 | 1.2 | 91.1 | 0.6 | 19 | ....do.... | ....do.... | ....do.... | Do. |
| 7 | 2.5 | 4.4 | 0.6 | 91.5 | 1.0 | 22 | ....do.... | ....do.... | ....do.... | Do. |
| 8 | 1.4 | 6.2 | 0.4 | 91.0 | 1.0 | 14 | ....do.... | ....do.... | Blocks | Poor. |
| 9 | 0.8 | 7.3 | 0.1 | 90.8 | 1.0 | 12 | ....do.... | ....do.... | ....do.... | Do. |
| 10 | | 4.8 | | 94.0 | 1.2 | 13 | ....do.... | Fair | ....do.... | Do. |
| 11 | 3.0 | 5.2 | 0.75 | 91.05 | | 5 | ....do.... | Good | Good | Good. |

¹ Dibutyl phthalate.

WC 130") for about 15 minutes at room temperature. The resulting aqueous lacquer composition has a Ford No. 4 Cup viscosity at 25° C. for 16 seconds, which can be readily sprayed, or brushed onto the surface of any desired shape.

This aqueous lacquer composition is sprayed directly onto the surface of a conventional "glossy" 8 inch x 10 inch photograph (which surface is ordinarily prone to both severe water spotting and finger-print smudges) at a rate of about 1.5 pounds per 1000 square feet of surface, and then permitted to dry for a few minutes at about 25° C. The surface of the resulting photograph has, by this treatment, become essentially free from "water spotting" (test to be described below), extremely resistant to permanent finger printing or finger smudging (finger prints or smudges, and even dust, can be wiped off the surface with a damp cloth), has a "60° gloss" of about 14% (a very desirable figure), and is essentially free of any diminution of visibility due to the lacquer coating (because the coating is practically completely transparent). The resulting coated photograph, which has a very pleasing matte surface, can be readily observed from even wide angles without an undesirable degree of interference from the bright reflections to which the original glossy photographic surface was subject. The lacquer coating is also observed to adhere very tenaciously to the photographic surface, being rated "good" by a "pressure sensitive tape" test which will be described below. The lacquer coating is also found to be free of any unacceptable tendency to "block," or stick together with another like surface after storage.

EXAMPLES 2-10

Following the procedure set out in Example 1, above, several other aqueous compositions are prepared and evaluated as a protective "matte" coating on both glossy photographic print surfaces and on both the gelatin side and the substrate side of conventional cellulose ester and poly(ethylene terephthalate) color transparencies. Results of these tests and data relating to the specific formulations tested are given in Table I.

From the data in Table I, it can be seen that coatings of either the ammonium copolymer or the high molecular weight poly(vinyl acetate) alone do not perform satisfactorily as a water and abrasion resistant non-blocking, pleasing matte coating. Thus, coatings of the poly(vinyl acetates) are too soft. (They can be scratched readily with a fingernail.) Also, they "block" excessively. Coatings made from the ammonium copolymers alone [without the poly(vinyl acetate)] are too reflective. (It is noteworthy that "60° gloss" values of more than 10 and less than 20 percent have been established by a panel of viewers as necessary for acceptable matte coatings for photographic coatings.) It is believed, surprisingly that one can blend a material such as the present ammonium copolymers having unacceptably high gloss in a large enough amount with high molecular weight poly(vinyl It has also been discovered that representatives of the two classes of polymers useful in the practice of this invention must be utilized in certain proportions in order to result in final lacquer coatings having all of the necessary, valuable properties described above. Thus, in the successful practice of this invention the ratio of ammonium copolymer to high molecular weight (poly (vinyl acetate) must be at least about 2 to 1 and at most about 6 to 1, respectively. Preferably this ratio should be from about 3:1 to about 5:1, respectively.

It will be noted that in the above example, the aqueous compositions are applied in such a way (sprayed) so as to yield final coatings of about 1 to 1.5 pounds of polymer(s) per thousand square feet of treated surface. Although very large amounts of such polymeric materials can be applied if desired (for example, by applying multiple coats to a given surface, or by using more concentrated aqueous lacquer compositions (generally, the coatings of this invention should contain at least about 0.25 pound, and preferably from about 0.5 to about 2 pounds, of polymers [total combined weights of dried partial ammonium copolymer and poly(vinyl acetate)] per 1000 square feet of treated surface.

It should also be noted that the valuable benefits described above (i.e., excellent adhesion, ideal matte finish, excellent abrasion resistance, and also total transparency to visible light) can be obtained by applying the aqueous lacquer compositions of this invention to glass (covering pictures, for example), and to other gloss surfaces such as the printed paper covers of magazines, and the like.

Described below are the more complicated of those tests mentioned hereinbefore:

Ford Cup Test.—ASTM method D-1200—No. 4 Cup used at 25° C. Viscosity of fluid specified in seconds required to drain the full cup.

60° Gloss Test.—Use of conventional Gardner Gloss Meter. Incident light applied at 60° from the surface being tested. Light reflected perpendicular to the surface is measured, and tabulated in percent of total incident light applied.

Tape Adhesion Test.—The coated surface is scored with a razor blade with parallel lines about ⅛ inch apart. This is then repeated at right angles, over an area of about one square inch. A pressure sensitive tape is applied to the area and immediately jerked away. Acceptable coatings remain on the treated surface, while "poor" coatings are largely removed by this rather severe test.

Blocking Test.—Squares 1 inch by 1 inch of coated material are placed face to face between one inch squares of heavy gauge cardboard. On the cardboard is placed a five pound weight. The weighted materials are then held for 16 hours at 125° F. At the end of the test, acceptable or "good" materials can readily be separated. Poor materials stick together severely in this test.

Water Spotting Test.—A drop of distilled water is permitted to dry under ambient conditions on the surface of the coated article. No permanent haze, swelling or other mark should be observable after the drop of water has dried.

Fingerprint Test.—A thumb is pressed gently upon the coated article for 30 seconds. No visible permanent change should occur in the coatings as a result of this test.

It will be readily appreciated that the aqueous compositions and the coatings of this invention can also contain relatively small amounts of materials other than those expressly mentioned hereinbefore, without detracting substantially from the benefits that can result from practicing this invention. For example, materials such as ultraviolet light absorbers, plasticizers, fungicides such as the chlorinated phenyl compounds and the like, antioxidants, and even colorants and cross-linking agents such as compatible polyisocyanates (reactive with carboxylic acids), if desired, can be present (often advantageously) in these compositions.

The invention has been described in detail with particular reference to preferred embodiments thereof, but it will be understood that variations and modifications can be effected within the spirit and scope of the invention.

What is claimed is:

1. An aqueous lacquer composition suitable for use in the preparation of a water and abrasion resistant coating having low gloss, said aqueous lacquer composition consisting essentially of
   (a) water
   (b) at least about 2.5 weight percent of the ammonium salt of a copolymer of ethyl methacrylate and methacrylic acid having an intrinsic viscosity measured at 25° C. in ethyl alcohol of at least about 0.2 dissolved in said water; and
   (c) dispersed through said water in the form of a latex, at least about 2 weight percent of high molecular weight poly(vinyl acetate;
   the amount of said water in said lacquer composition being at least about 50 weight percent of said composition and the ratio of said copolymer and said poly(vinyl acetate) in said compositions being from about 2 to 1 to about 6 to 1, respectively.

2. An aqueous composition as in claim 1, wherein the amount of said copolymer in said aqueous composition is at least about 4 weight percent, and the weight ratio of said copolymer to said poly(vinyl acetate) in said aqueous composition is from about 3:1 to about 5:1, respectively.

3. An aqueous composition as in claim 1, wherein said composition has a Ford No. 4 Cup viscosity at 25° C. of at most about 20.

4. An aqueous composition as in claim 3, wherein said composition contains at least about 90 weight percent of water.

5. An aqueous composition as in claim 4, wherein said composition also contains at least one plasticizer.

6. An aqueous composition as in claim 5, wherein said plasticizer is dibutyl phthalate.

7. An aqueous lacquer composition suitable for use in the preparation of a water and abrasion resistant coating having low gloss; said aqueous lacquer composition consisting essentially of
   (a) water;
   (b) dissolved in said water, about 4.8 weight percent of the ammonium salt of a copolymer of ethyl methacrylate and methacrylic acid in a molar ratio of about 1.5 to 1, respectively; about 60 percent of the acid groups on said copolymer being converted to the ammonium salt; and
   (c) about 2.6 weight percent of poly(vinyl acetate) dispersed through said water in the form of a latex; said composition having a Ford No. 4 Cup viscosity at least 25° of at most about 20 seconds.

8. An aqueous lacquer composition as in claim 7, wherein said composition additionally contains about 1 weight percent of dibutyl phthalate.

References Cited

UNITED STATES PATENTS 2,998,400   8/1961   French _____ 260—29.6 RW
3,035,004   5/1962   Glavis _____ 260—29.7

OTHER REFERENCES

Chem. Abstracts 63, 11817b (1965).
Chem. Abstracts 65, 15578h (1966).

WILLIAM H. SHORT, Primary Examiner

E. A. NEILSEN, Assistant Examiner

U.S. Cl. X.R.

95—1; 117—124 E, 138.8 F, 141, 161 UC; 260—901

UNITED STATES PATENT OFFICE
CERTIFICATE OF CORRECTION

Patent No. 3,733,293      Dated May 15, 1973

Inventor(s) John F. Gallagher and Martin Salo

It is certified that error appears in the above-identified patent and that said Letters Patent are hereby corrected as shown below:

Column 1, line 21, "or" should read "of";
Column 3, line 58, "event" should read "even";
Column 4, line 42, "above" should read "about";
Column 5, line 23, "for" should read "of";
Column 6, line 44, "also" should read "almost".

Signed and sealed this 23rd day of April 1974.

(SEAL)
Attest:

EDWARD M. FLETCHER, JR.
Attesting Officer

C. MARSHALL DANN
Commissioner of Patents